July 8, 1958 — C. B. STAPLETON — 2,841,875
INDICATOR TYPE SNAP GAGE
Filed Aug. 4, 1955 — 3 Sheets-Sheet 1
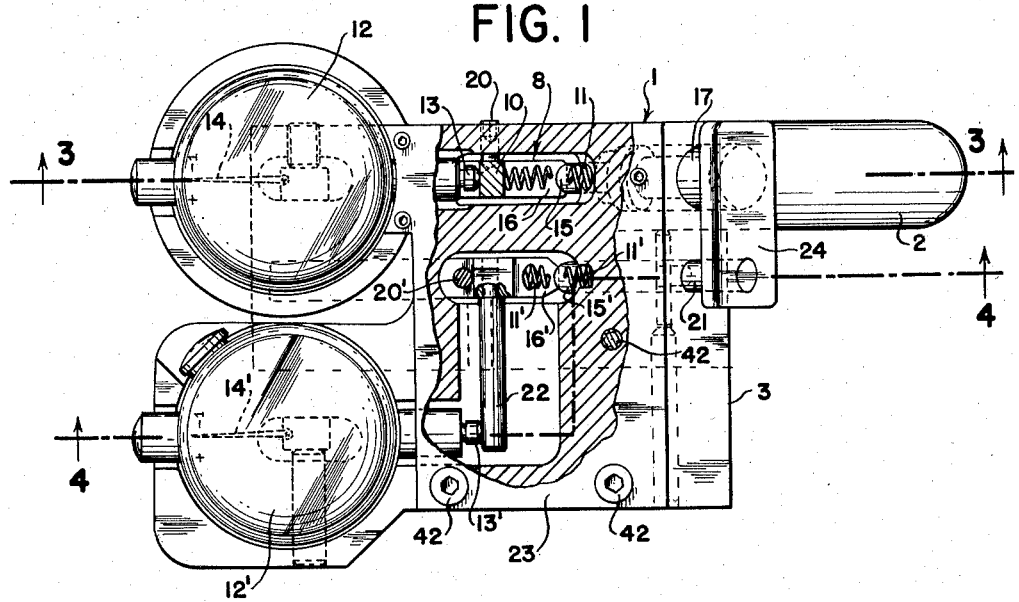
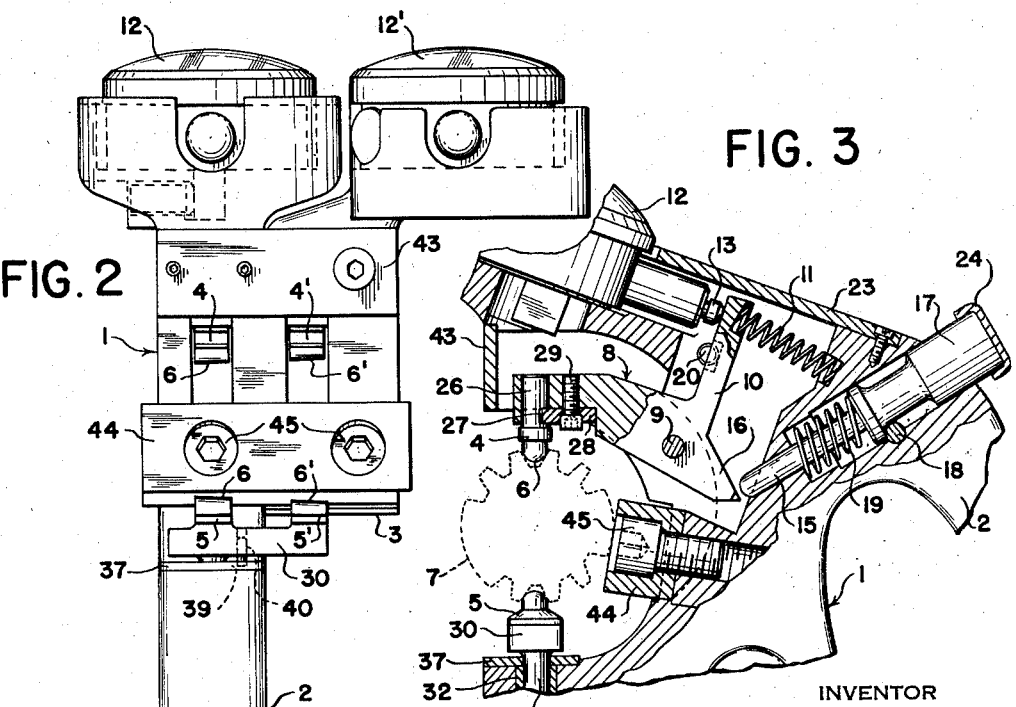
INVENTOR
Clarence B. Stapleton
BY
Pennie, Edmonds, Morton, Barrows & Taylor
HIS ATTORNEYS July 8, 1958 — C. B. STAPLETON — 2,841,875
INDICATOR TYPE SNAP GAGE
Filed Aug. 4, 1955 — 3 Sheets-Sheet 2
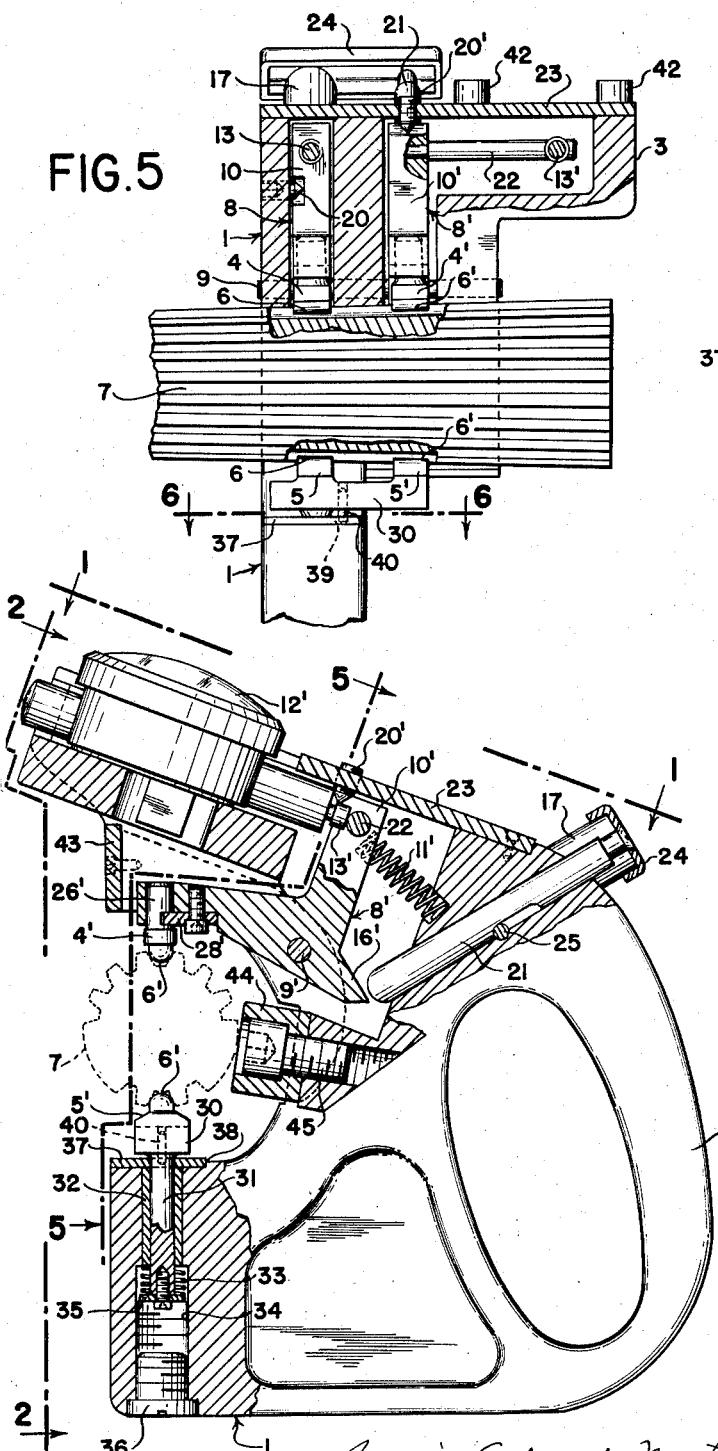
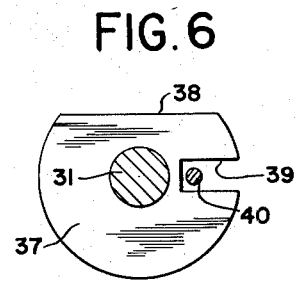
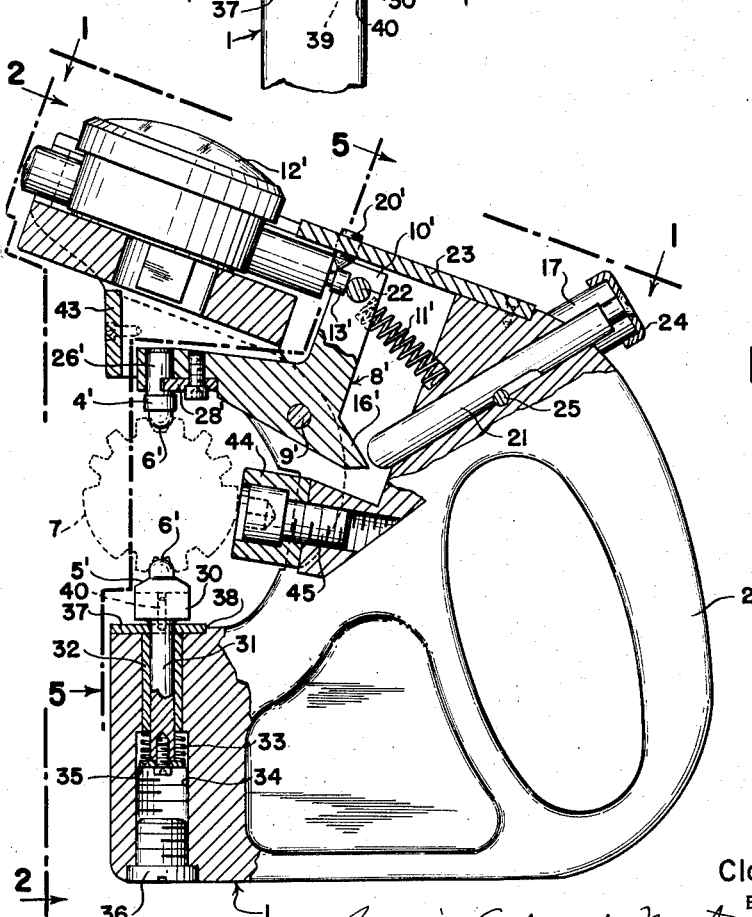
FIG. 5
FIG. 6
FIG. 4
INVENTOR
Clarence B. Stapleton
BY
HIS ATTORNEYS

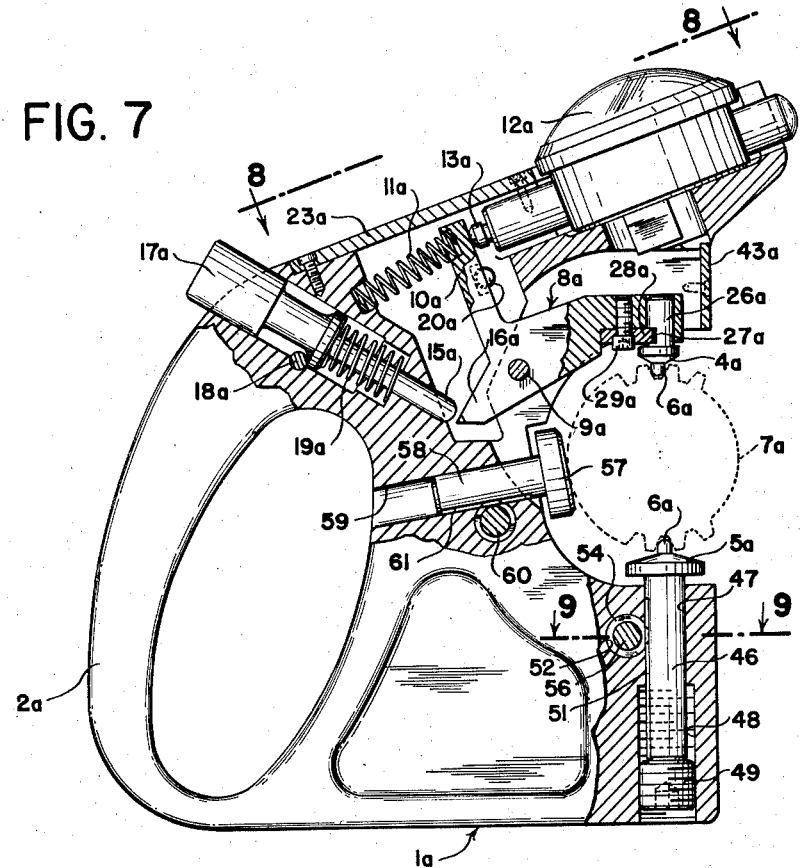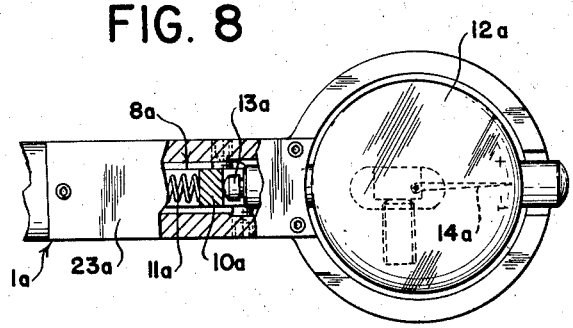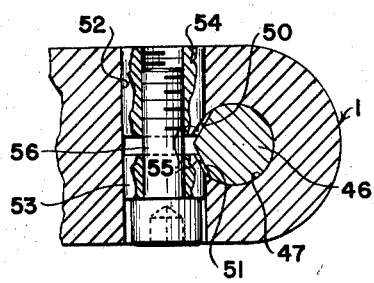

United States Patent Office 2,841,875
Patented July 8, 1958

2,841,875

INDICATOR TYPE SNAP GAGE

Clarence B. Stapleton, Royal Oak, Mich., assignor to Vinco Corporation, Detroit, Mich., a corporation of Michigan Application August 4, 1955, Serial No. 526,375

5 Claims. (Cl. 33—148)

This invention relates to indicator type snap gages such as are used for checking the dimensions of gears, splines and the like, and also to such gages for measuring the taper of tapered articles such, for example, as tapered splines, pins and shafts, and, more especially, tapered splines.

In the manufacture of gears and also of tapered splines and the like, the checking of the thickness of the teeth as the manufacturing operation progresses is done by means of a "measurement over pins," or its equivalent. Such "pins" are accurately ground to a known dimension and are placed resepctively in the tooth spaces on opposite sides of the gear or spline. They contact the teeth at, or near, the pitch line of the part or workpiece. When the cutting or grinding of the gear has been carried to the point where the proper or desired tooth thickness has been reached, the diameter of the gear over these pins, or the "pin dimension" called for, will be satisfied.

The snap gage of the present invention is of the type having all gaging blocks with individual contact portions in the form of a "pin," so as to eliminate the necessity of manipulating separate pins. When, however, the taper of a tapered pin, shaft or the like is to be measured, such gaging blocks may be replaced by others whose contact portions are flat or rounded, instead of pin shaped.

The object of the present invention, principally, is to provide an improved snap gage by means of which both the pin dimension and the amount of taper of tapered splines can be readily and accurately checked.

Another object of the invention, however, is to provide a snap gage whereby the amount of taper of a tapered pin or shaft, or the like can be quickly and accurately checked.

A further object of the invention is to provide an improved snap gage by means of which the pin dimension of a gear or spline that is not tapered can be checked.

These and other objects of the invention will be apparent from the following description of the invention in connection with the accompanying drawings. In these drawings:

Fig. 1 is a view of the improved snap gage for measuring both pin dimension and amount of taper, this figure showing the gage in inclined plan view as indicated by line 1—1 of Fig. 4, but with parts broken away and shown in section;

Fig. 2 is a front view of the gage as illustrated in Fig. 1, that is, a view in modified elevation looking from the left of Fig. 1, and also from the left of Fig. 4 as indicated by line 2—2;

Fig. 3 is a partial vertical section taken on line 3—3 of Fig. 1;

Fig. 4 is a view mostly in vertical section, the upper portion being taken on broken line 4—4 of Fig. 1, and the lower portion on line 3—3 of Fig. 1, and the dial indicator and the handle portion being shown in elevation;

Fig. 5 is a view in section on broken line 4—4 of Fig. 4 showing the application of the gage to a tapered spline;

Fig. 6 is a detail horizontal section taken on line 6—6 of Fig. 5;

Fig. 7 is a view similar to Fig. 4 to illustrate the mechanism of a snap gage having only a single dial indicator;

Fig. 8 is a view partly in inclined plan taken on line 8—8 of Fig. 7, but with parts broken away and shown in section; and Fig. 9 is a detail horizontal section taken on line 9—9 of Fig. 7.

The snap gage of the present invention comprises a frame 1 having a handle 2, and, in the form of the invention shown in Figs. 1–6, two calipering mechanisms are arranged side by side within and upon this frame. One of these calipering mechanisms is built into the frame in line with the handle 2 as shown in Fig. 1. The second calipering mechanism is built into a lateral extension 3 of the frame as indicated in Figs. 1, 2 and 5.

The first calipering mechanism comprises a pair of cooperating gaging blocks 4 and 5 (Figs. 3 and 5) the upper block 4 being movable and the lower block 5 being stationary. These gaging blocks are each provided with pin shaped contact portions 6, which, as shown in Figs. 3 and 5, are short semicylindrical surfaces shaped to engage the sides of the pair of teeth of the spline 7 to be gaged which are adjacent to the particular gaging block, one such pair of teeth being at the top of the spline, and the second such pair at the bottom and diametrically opposite the first pair.

The movable gaging block 4 of the first calipering mechanism is mounted on the outer end of a lever 8 (Fig. 3). This lever is pivoted at 9 to frame 1 and has an upper extension or arm 10 which is urged towards plunger 13 by means of a compression coil spring 11 arranged between the arm and a part of frame 1.

The first calipering mechanism also includes a dial indicator mechanism 12 which is provided with an operating plunger 13 and a pointer 14. This mechanism is of conventional construction and so arranged that a very slight movement (approximately 1/100 of an inch) of the operating plunger 13 causes the pointer 14 to make a complete 360° sweep around the dial scale, the multiplication ratio being usually 150:1. Operating plunger 13 is spring biased by the indicator mechanism to its outer position. The forward surface of arm 10 of lever 8 engages operating plunger 13 to actuate the dial indicator mechanism.

The lever 8 is actuated to retract or raise the movable gaging block 4, so as to allow the removal or insertion of a part or workpiece to be gaged, by means of an actuating plunger 15, the inner end of which comes into engagement with a tail portion 16 formed on lever 8. The outer end of plunger 15 is provided with an enlarged head 17 to be referred to later. The plunger is urged toward its normal outward position against a stop 18 by means of a coil spring 19. Stop 18 is so arranged that in its normal position the inner end of plunger 15 is disengaged slightly from the tail portion 16 so that the force of spring 19 will not interfere with the operation of the dial indicator 12 by spring 11. An adjustable stop screw 20 which is tightly fitted in a bore in frame 1 has a conical point which engages a sloping surface near one edge of arm 10 to limit the extent of actuation of plunger 13 by the spring 11.

The second calipering mechanism is illustrated particularly in Figs. 1, 4 and 5 and is, except for its actuating plunger 21 and the arrangement for moving operating plunger 13' of the second dial indicator 12', identical with the first calipering mechanism above described. The corresponding parts of the second calipering mechanism are indicated by primed reference numerals corresponding to those of the first calipering mechanism. The two dial indicators 12 and 12' are mounted side by side on the frame of the device as shown in Figs. 1 and 2.

The second pair of movable and stationary gaging blocks 4' and 5' (Figs. 4 and 5) are spaced apart a predetermined distance lengthwise of the part or workpiece (such as the tapered spline 7) to be measured. In the gage as actually constructed this spacing distance is ¾ inch between the centers of the gaging blocks, but this distance may, of course, be varied as desired. In order to actuate plunger 13' of the second dial indicator mechanism, a lateral extension of lever 8' is provided in the form of a rigid rod 22 (Figs. 1 and 5) which is fixed solidly to and projects from one side of the upwardly projecting arm 10' of lever 8'. The side of this rod 22 near its outer end engages operating plunger 13'.

The stop screw 20' for lever 8' is in a slightly different location than the stop screw 20, being placed in a bore in a cover plate 23 which is secured by socket screws to the frame 1 at the top of the gage. The inner end of screw 20' extends into engagement with the upper sloping corner of arm 10', instead of into engagement with the side of this arm.

The actuating plunger 21 for the second calipering mechanism has a laterally extending plate 24 riveted or otherwise firmly secured to its outer end. This plate extends sidewise over the upper end of head 17 of operating plunger 15 for the lever 8 of the first calipering mechanism, so that this plate constitutes a common actuating or operating means for the two levers 8 and 8'. In the reverse movement, plate 24, being attached to plunger 21, moves this plunger outwardly under the action of spring 19 for the operating plunger 15. A retaining screw 25 (Fig. 4) projects into a lateral recess of the side of plunger 21 to limit its outward movement.

The individual gaging blocks 4 and 4' (Fig. 5) are pivotally mounted in their respective supporting levers 8 and 8'. Thus, referring to Fig. 3, gaging block 4 has a cylindrical shank 26 which is received within a bore near the end of lever 8. The shank closely fits this bore, but at the same time readily turns therein. Since the purpose of such pivotal mounting is to allow the pin shaped contact 6 of the gaging block to align itself with the sides of the adjacent teeth of the spline 7, only a limited pivoting movement is required.

In order to limit the turning movement of shank 26 in its bore and also to retain the gaging member 4 in position, a recess 27 is cut laterally in one side of shank 26, and a hardened steel plate 28 is fixed in position on lever 8 adjacent gaging block 4 in such a way that the edge of this plate enters the recess 27. The edge of plate 28 which is within this recess, however, is spaced very slightly from the bottom of recess 27, and this spacing enables the edge of plate 28 to act as a stop to limit the rotation of shank 26 in either direction. Plate 28 is held in position by means of a screw 29 and it will be understood the thickness of this plate is such that it fits tightly in the sides of recess 27 so as to prevent any longitudinal movement of shank 26. Thus gaging block 4 can turn to a limited extent, but is fixed against movement in any other direction.

It is to be understood that gaging block 4' (Fig. 4) is similarly mounted at the end of lever 8'.

The lower or stationary gage blocks 5 and 5' are attached to a common support 30 and as shown, they are made integral with their support. Support 30 is pivoted for swinging or limited rotative movement about an axis which is in alignment with that of one of the movable gage blocks 4 or 4', and as shown on the drawings, this alignment is with the axis of gaging block 4. For this purpose support 30 has an elongated cylindrical shank 31 which is received within a bushing 32 that is in turn fitted into a bore in the lower part of frame 1.

Shank 31 may be retained in position in any suitable way, for example, as shown in Fig. 3 by means of a coil spring 33 (Fig. 4), which holds it resiliently in position. The upper end of this spring bears against the shoulder which is formed at the upper end of a countersunk portion 34 of the bore which receives bushing 32. The lower end of spring 33 may bear against a washer 35 which is held on the lower end of shank 31 by means of a screw. The lower end of countersunk portion 34 may be threaded and closed by means of a screw 36.

Although the common support 30 for the stationary gaging blocks 5 and 5' is arranged to pivot about the axis of its shank 31 in order that the two gaging blocks may align themselves with the tooth faces, it would be inconvenient, in applying the snap gage to a part or workpiece, if the support 30 should be allowed to swing to any great extent away from its normal position where the two contact portions 6 and 6' of the lower gaging blocks are in general directional agreement with the contact portions of the upper or movable gaging blocks 4 or 4'.

To this end a metal plate 37 (Fig. 4) is fixed in any suitable manner to the frame 1 surrounding the upper end portion of shank 31 and adjacent the lower surface of support 30. One edge of this disc or plate is slabbed or flattened as indicated at 38 and engages a shoulder on frame 1 to prevent turning of the disc. Also disc 37 has a radial slot 39 cut inwardly from its circular edge, and into this slot the lower end of a hardened steel pin 40 extends, such pin being mounted to project from the lower surface of common support 30. Slot 39 has a width sufficiently greater than the diameter of pin 40 to permit the desired swinging or angular pivoting movement of common support 30 and its two gaging blocks.

Cover plate 23 is placed over the necessary recesses in frame 1 and its extension 3 within which the two levers 8 and 8' for the movable gage blocks 4 and 4' are mounted. This plate may be held in position in any suitable manner as for example, by means of socket head screws 42. A somewhat similar but smaller plate 43 is mounted on the front of the gage frame beneath the dial indicators and constitutes a protection for the forward ends of the two calipering levers 8 and 8' and the gaging blocks mounted upon them.

A locating block 44 is secured to frame 1 intermediate the lower and upper gaging blocks and serves to position the workpiece 7 when it is introduced into the gage. This locating block may be secured in position in any desired manner as for example, by means of the two socket head screws 45 shown in Fig. 2.

Referring now to Figs. 7–9, the mechanism for mounting and operating the upper gaging block 4a is identical with that of Figs. 3 and 5. The description will not be repeated, since it is thought sufficient to state that the same reference numerals have been used in Figs. 7 and 8 with the addition of the subscript a. The lower portion of Fig. 7, however, illustrates a modified form of stationary gaging block 5a. This is a single gaging block, that is to say, it has only one pin shaped contact portion 6a to cooperate with the single contact portion of upper or movable gaging block 4a in measuring splines that are not tapered.

The feature of gaging block 5a is the manner in which it is attached to or fixed in position on, the frame 1. It is provided with a cylindrical shank 46 which has a sliding fit in a suitable bore 47 in the frame. The lower end of shank 46 extends into a somewhat enlarged lower portion of bore 47 indicated by reference numeral 48. The shank 46 with gaging block 5a may be positioned to suit the diameter of the part to be gaged by means of a screw 49 which is threaded into the enlarged bore 48.

For the purpose of immovably securing shank 46 after it has been adjusted to the proper position, a special clamping means is provided. This is shown in Figs. 7 and 9. Two similar flat intersection surfaces 50 and 51 are machined along one side of shank 46 at an obtuse angle to one another and symmetrically arranged with respect to a radial plane passing through their intersection. A cross-bore 52 is made in frame 1 at right angles to and intersecting bore 47, and in cross-bore 52 there are placed two special clamping pieces 53 and 54. These are both circular in cross section to fit the circular cross-bore 52, but their inner corners are chamfered as indicated at 55 and these chamfered surfaces cooperate with the flat intersecting surfaces 50 and 51.

A socket head clamping screw 56, arranged with its head in engagement with the outer surface of clamping member 53, passes freely through an aperture in this member and is threaded into an aperture in clamping member 54. When the screw is set up, it draws the angular chamfered surfaces 55 simultaneously into engagement with the flattened faces 50 and 51 with the result that the entire opposite semi-circular surface of shank 46 is forced into frictional engagement with the surface of its bore. This produces a very effective locking of the shank 46 and its gaging head 5a in the desired location.

When the snap gage is used to measure a non-tapered spline, or gear, such as indicated at 7a in Fig. 7, a disc-shaped locating block 57 may be used, and, if desired, this block may be held in position by a special clamping mechanism similar to that just described. For this purpose, block 57 is provided wtih a shank 58 which is received within a bore 59, and the two clamping nuts are actuated by means of a screw 60 to cause their chamfered corner surfaces to engage the flattened surfaces 61 of the shank.

In using the two-indicator type of gage for checking the taper and tooth thickness of a tapered spline, or the like, such as the spline 7 shown in Figs. 3 and 4, the spline is first rested upon the lower or stationary gaging blocks 5 and 5' the adjacent surfaces of the two adjacent teeth of the spline being brought into engagement with the pin shaped contact portions 6 and 6' of these gaging blocks (Fig. 5). The part or workpiece 7 is then rotated inwardly of the gage until it strikes the surface of locating block 44, the thumb of the user being pressed against common actuating member 24 so as to cause the simultaneous retraction of the upper or movable gaging blocks 4 and 4' during this procedure. With the workpiece in contact with locating block 44, the thumb pressure on common actuating member 24 is reduced thus allowing the levers 8 and 8' to move their respective gaging blocks 4 and 4' into engagement with the adjacent surfaces of the opposite pair of teeth of the spline.

During this operation, the pin shaped contact portion of gaging block 4 engages the faces of the two adjacent upper teeth, and gaging block 4, rotates about its axis until its pin shaped contact portion is in alignment with the upper two spline teeth. Gaging block 4' engages the faces of the upper two teeth, with the part 7, together with common support 30 for the lower gaging blocks 5 and 5' and movable upper gaging block 4, rotating about the axis of this gaging block 4 (and the axis of shank 31 of common support 30), until movable gaging block 4' makes full contact with the faces of the adjacent upper two teeth, such upper contact 4' also rotating about its own axis into alignment with the faces of these upper teeth.

The pin shaped contact portions 6 and 6' of the lower or stationary contacts 5 and 5' are machined and ground to the same degree or angle of taper as that of the workpieces 7 to be gaged. Correspondingly, the surfaces of each of the pin shaped contact portions 6 and 6' of the upper or movable gage blocks 4 and 4' are similarly independently machined and ground to the same taper angle. Consequently, when the workpiece is placed within the gage in the manner described in the preceding paragraph, and the contact portions of the upper contacts 4 and 4' come into alignment and engagement with the faces of the upper two adjacent teeth, the actuating springs 11 and 11' of the respective levers 8 and 8' will cause independent operation of the respective dial indicators 12 and 12'. Their pointers 14 and 14' will show on the dials the precise degree of conformity of such workpieces to the specified angle of taper, and also indicate the diameter of the workpieces at the spacing of the calipering devices.

Without this device, it would be necessary to gage the workpiece at one place and then move the gage along the workpiece by the specified spacing and take another gage reading. Whereas, with the present gaging devices, these readings can be made simultaneously at one operation.

By providing only for limited rotation of both the upper and lower gaging blocks, the snap gage may be applied expeditiously to workpieces, because at no time can the upper pin shaped contact portions or common support 30 swing so far out of alignment with the teeth of the part as to make it impossible for the teeth to turn the gaging blocks and support 30 to their proper positions.

It will be understood that the scope of the invention is set forth in the appended claims.

I claim:

1. In a device for gaging tapered articles, a frame, two calipering mechanisms mounted on said frame and spaced apart a predetermined distance, each of said mechanisms comprising a stationary and a movable gaging block, said stationary gaging blocks being mounted in said frame, separate levers pivoted on said frame having said respective movable gaging blocks mounted thereon, dial indicators carried by said frame, said levers being independently connected with said respective indicators to operate them, said indicators being on centers which are spaced apart on said frame a greater distance than said calipering mechanisms, one of said gaging block levers engaging the operating member of one of said indicators, and the other of said levers having a lateral extension which engages the operating member of the second indicator, said levers being individually spring pressed to urge their respective gaging blocks independently toward the respective stationary gaging blocks and simultaneously therewith to actuate said indicators, and common means for actuating said levers to retract their gaging blocks and to allow them to close upon the tapered article to be measured.

2. In a device for gaging tapered splines and the like, a frame, two calipering mechanisms mounted on said frame and spaced apart a predetermined distance, each of said mechanisms comprising a stationary and a movable gaging block, each of said blocks having a pin shaped contact portion, separate levers pivoted on said frame having said respective movable gaging blocks each pivotally mounted thereon to turn on an axis perpendicular to the axis of the spline to be gaged, dial indicators carried by said frame, said levers being independently connected with said respective indicators to operate them, said levers being individually spring pressed to urge their respective gaging blocks independently toward the respective stationary gaging blocks and simultaneously to actuate said indicators, common means for actuating said levers to retract their gaging blocks and to allow them to close upon the tapered articles to be measured, and a common support having said stationary gaging blocks mounted thereon, said support being pivoted on said frame with the axis of said pivot in line with one of said stationary and one of said movable gaging blocks.

3. A gaging device as claimed in claim 2 wherein the individual movable gaging blocks and the common support for the two stationary gaging blocks are each provided with stop means for limiting their turning movement in each direction so that the engagement of the pin shaped contact portions of the respective gaging blocks with the sides of the adjacent pairs of spline teeth will turn the respective gaging blocks into aligned position when the gage is applied to the article to be gaged.

4. In a device for gaging tapered splines and the like simultaneously at two points spaced a predetermined distance apart lengthwise of the spline, a frame, two stationary and two movable gaging blocks disposed in spaced pairs to engage the opposite sides of the spline to be measured, each of said gaging blocks having a contact portion in the form of a pin adapted to engage the faces of two adjacent teeth of said spline, the surfaces of the pin shaped contacts of the stationary gaging blocks being in alignment with one another and disposed at an angle to the axis of said spline corresponding to the amount of taper of said spline, the pin shaped surfaces of the two movable gaging blocks each being disposed at an angle to the axis of said spline corresponding to the spline taper, two levers pivoted on said frame each carrying one of said movable gaging blocks, a spring operatively connected to each of said levers for urging said gaging blocks independently against said spline, said movable gaging blocks being pivotally mounted on said respective levers each for limited rotation on an axis at right angles to the axis of said spline so as to permit its pin shaped contact to turn into engagement with the faces of the adjacent pair of spline teeth, a common support for said stationary gaging blocks having a pivot mounting on said frame in axial alignment with the axis of the pivot of one of said stationary blocks, two dial indicator mechanisms mounted on said frame and independently actuated by said respective levers, and manually operated means for actuating said levers to retract said movable gaging blocks and to allow said blocks to close upon said spline under the action of said springs.

5. In a device for gaging splines and the like, a frame, stationary and movable gaging blocks disposed to engage the opposite sides of the spline to be measured, each of said gaging blocks having a contact portion in the form of a pin having opposite contact surfaces parallel to the teeth of said spline for engaging the faces of two adjacent teeth thereof, said stationary gaging block being fixed to the lower part of said frame, a lever pivoted on said frame for carrying said movable gaging block, a spring operatively connected to said lever for urging said gaging block against said spline, and a dial indicator mechanism actuated by said lever, and means for mounting said movable gaging block on said lever for limited turning movement on an axis at right angles to the axis of said spline so as to permit its pin-shaped contact portion to turn into engagement with the faces of the adjacent pair of spline teeth, said means comprising a cylindrical shank on said movable gaging block and a bore in one end of said lever, said shank turning in said bore and said shank having a lateral recess in one side thereof, and a retaining plate fixed to said lever with one edge thereof extending into said recess a distance less than the depth of said recess so that when the gaging block is turned the bottom of the recess at one side thereof will be brought into engagement with the edge of said plate to limit the turning movement of the gaging block in either direction.

References Cited in the file of this patent
UNITED STATES PATENTS

| | | |
|---|---|---|
| 1,291,211 | Slocomb | Jan. 14, 1919 |
| 1,309,700 | Scusa | July 15, 1919 |
| 1,389,381 | Renton | Aug. 30, 1921 |
| 1,643,570 | Bartholdy | Sept. 27, 1927 |
| 1,967,618 | Jazwieck | July 24, 1934 |
| 2,500,558 | Maxwell | Mar. 14, 1950 |
| 2,551,471 | Snow | May 1, 1951 |
| 2,561,534 | Parker et al. | July 24, 1951 |
| 2,597,030 | Pistoles | May 20, 1952 |